United States Patent
Nishikino et al.

(10) Patent No.: US 7,700,876 B2
(45) Date of Patent: Apr. 20, 2010

(54) EXTERNAL DEVICE AND ELECTRONIC APPARATUS

(75) Inventors: Sachiko Nishikino, Tokyo (JP); Yoshiaki Nagao, Tokyo (JP); Takehisa Shimazu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 262 days.

(21) Appl. No.: 11/179,556

(22) Filed: Jul. 13, 2005

(65) Prior Publication Data
US 2006/0021789 A1 Feb. 2, 2006

(30) Foreign Application Priority Data

| Jul. 15, 2004 | (JP) | ............................. 2004-208011 |
| Aug. 27, 2004 | (JP) | ............................. 2004-249054 |
| Apr. 26, 2005 | (JP) | ............................. 2005-127896 |

(51) Int. Cl.
*F16L 3/08* (2006.01)
(52) U.S. Cl. .................................................. 174/68.1
(58) Field of Classification Search ................. 399/107, 399/110, 405; 174/135, 520, 65 R, 138 F, 174/151, 66, 559, 55 R, 52.1, 659, 73.1, 68.1, 174/72 A, 72 C
See application file for complete search history.

(56) References Cited

U.S. PATENT DOCUMENTS

| 3,717,319 | A | * | 2/1973 | Schultz et al. ................. 248/49 |
| 3,770,022 | A | * | 11/1973 | Beisemann ................... 138/108 |
| 4,275,941 | A | * | 6/1981 | Ogasawara et al. ........... 174/481 |
| 4,337,934 | A | * | 7/1982 | Caveney ........................ 269/77 |
| 4,580,004 | A | * | 4/1986 | Beneteau ...................... 174/559 |
| 4,719,314 | A | * | 1/1988 | Nothnagel et al. ............ 174/481 |
| 5,093,887 | A | * | 3/1992 | Witte ........................... 385/135 |
| 5,174,293 | A | * | 12/1992 | Hagiwara ..................... 600/300 |
| 5,221,813 | A | * | 6/1993 | Michael et al. ............... 174/659 |
| 5,286,919 | A | * | 2/1994 | Benson et al. ................. 174/50 |
| 5,547,390 | A | * | 8/1996 | Laherty ........................ 439/373 |
| 5,575,677 | A | * | 11/1996 | Buckner et al. .............. 439/373 |
| 5,639,049 | A | * | 6/1997 | Jennings et al. ............. 248/74.2 |
| 5,659,386 | A | * | 8/1997 | Yamada ....................... 399/194 |
| 5,693,908 | A | * | 12/1997 | Amberger .................... 174/656 |
| 5,751,544 | A | * | 5/1998 | Song ............................ 361/681 |
| 5,825,962 | A | * | 10/1998 | Walters et al. ............... 385/135 |
| 5,837,942 | A | * | 11/1998 | Becker ...................... 174/138 F |
| 5,991,570 | A |   | 11/1999 | Haga et al. ................... 399/114 |
| 6,095,461 | A | * | 8/2000 | Daoud ........................... 248/65 |
| 6,133,527 | A | * | 10/2000 | Park et al. .................... 174/650 |
| 6,540,312 | B1 | * | 4/2003 | Lane ......................... 312/223.6 |
| 6,646,893 | B1 | * | 11/2003 | Hardt et al. .................. 361/826 |

(Continued)

FOREIGN PATENT DOCUMENTS

JP    2000-131909    5/2000

(Continued)

*Primary Examiner*—John Fitzgerald
(74) *Attorney, Agent, or Firm*—Oblon, Spivak, McClelland, Maier & Neustadt, L.L.P.

(57) ABSTRACT

An external device that is electrically connected to a main unit by a plurality of electric cables includes a first casing member storing a function unit; an external cover covering the first casing member; and a first space provided between the first casing member and the external cover. The electric cables are pulled out of the first casing member, bundled together, supported by the first casing member, and extended out of the external cover through the first space.

14 Claims, 14 Drawing Sheets

U.S. PATENT DOCUMENTS

| | | | |
|---|---|---|---|
| 6,884,942 B2* | 4/2005 | McGrath et al. | 174/68.1 |
| 6,954,577 B2* | 10/2005 | Kohan | 385/135 |
| 6,968,140 B2* | 11/2005 | Asai | 399/107 |
| 7,021,591 B1* | 4/2006 | Gretz | 248/68.1 |
| 7,092,258 B2* | 8/2006 | Hardt et al. | 361/826 |
| 7,097,047 B2* | 8/2006 | Lee et al. | 211/26.2 |
| 7,107,675 B2* | 9/2006 | Boe | 29/876 |
| 7,219,863 B1* | 5/2007 | Collett, II | 248/68.1 |
| 7,345,239 B2* | 3/2008 | Tousignant et al. | 174/68.1 |
| 2001/0002689 A1* | 6/2001 | Shelton et al. | 248/65 |
| 2001/0010770 A1* | 8/2001 | Kominato | 399/405 |
| 2001/0040705 A1* | 11/2001 | Yokota | 358/474 |
| 2002/0125800 A1* | 9/2002 | Knudsen et al. | 312/223.6 |
| 2002/0168197 A1* | 11/2002 | Kitozaki | 399/88 |
| 2003/0075646 A1* | 4/2003 | Womack et al. | 248/49 |
| 2004/0065787 A1* | 4/2004 | Hardt et al. | 248/68.1 |
| 2004/0096237 A1* | 5/2004 | Asai | 399/107 |
| 2004/0238199 A1* | 12/2004 | Yamanaka et al. | 174/68.1 |
| 2005/0057912 A1* | 3/2005 | Hardt et al. | 361/826 |

FOREIGN PATENT DOCUMENTS

JP  2002-101242  4/2002

* cited by examiner

Background Art FIG. 15A
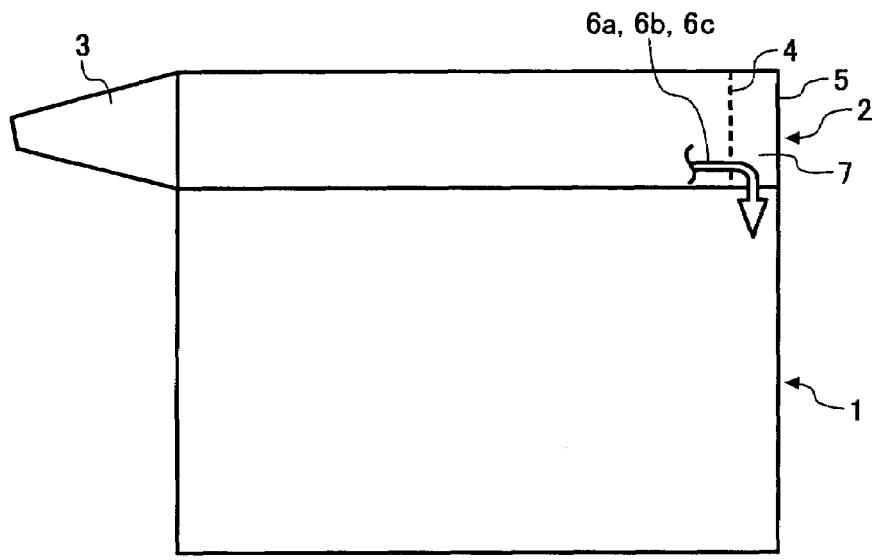
Background Art FIG. 15B
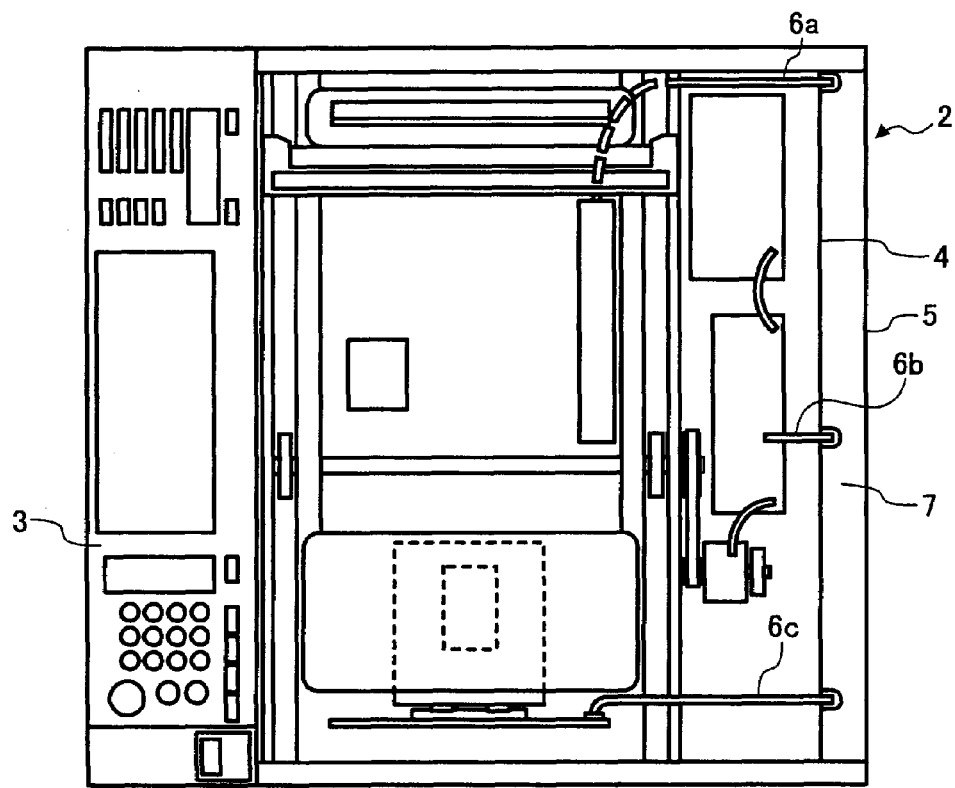

EXTERNAL DEVICE AND ELECTRONIC APPARATUS

CROSS-REFERENCE TO RELATED APPLICATIONS

The present document incorporates by reference the entire contents of Japanese priority documents, 2004-208011 filed in Japan on Jul. 15, 2004, 2004-249054 filed in Japan on Aug. 27, 2004, and 2005-127896 filed in Japan on Apr. 26, 2005.

BACKGROUND OF THE INVENTION

1. Field of the Invention

The present invention relates to a technology for attaching an external device to a main apparatus using an electric cable.

2. Description of the Related Art

In an electronic apparatus such as an image forming apparatus, an optional device is typically attached to a main unit for enhancing functions of the main unit. For example, a composite machine is an image forming apparatus that has functions of a copier, a printer, and a fax machine. A composite machine shown in FIGS. 15A and 15B includes an image reading unit 2 (optional device) mounted on an imaging device 1 (main unit). An operation section 3 protrudes from the front side of the image reading unit 2. A reading unit of the image reading unit 2 is located in a casing member 4, and the casing member 4 is covered by an external cover 5.

Electric cables 6a, 6b, 6c extend out from the reading unit, pass through a space 7 between the casing member 4 and the external cover 5, and connect to the imaging device 1, in such a manner not to cross over each other. As shown in FIG. 16, the electric cables 6a, 6b, 6c are electrically connected to electrical substrates a, b, c in the imaging device 1, respectively.

Different optional devices can be provided according to a user's requirement. For example, when a user orders a composite machine, the imaging device 1 and the image reading unit 2 are provided. When a user orders a printer, only the imaging device 1 is provided, and when a user orders a fax machine or a copier, the imaging device 1, the image reading unit 2, and a corresponding circuit board are provided.

The main unit and the optional device are not always provided integrally. According to a user's requirement, the optional device can be an external device that is attached to the main unit with electric cables, and located separately.

For example, as shown in FIG. 17, the image reading unit 2 is placed on a table 8, and is electrically connected to the imaging device 1 with electric cables 6d, 6e, and 6f. Accordingly, the operation section 3 is situated at a lower level as compared to the case when the image reading unit 2 is mounted on the imaging device 1. This makes it easy for anyone to operate the image reading unit 2, thus improving convenience.

Japanese Patent Application Laid Open No. 2002-101242 and Japanese Patent Application Laid Open No. 2000-131909 disclose examples of the conventional technology.

However, in the conventional electronic apparatus, the optimal lengths of each electric cable 6d, 6e, and 6f differ, depending on how the imaging device 1 and the image reading unit 2 placed on the table 8 are located. In the example shown in FIG. 18, the electric cable 6f is not long enough that it is stretched along the imaging device 1. On the other hand, the electric cables 6d, 6e are too long that they hang down. Accordingly, the electric cables can impair safety or spoil the appearance of the electronic apparatus.

SUMMARY OF THE INVENTION

It is an object of the present invention to at least solve the problems in the conventional technology.

An external device according to one aspect of the present invention, which is electrically connected to a main unit by a plurality of electric cables, includes a casing member storing a function unit; an external cover covering the casing member; and a space provided between the casing member and the external cover. The electric cables are pulled out of the casing member, bundled together, supported by the casing member, and extended out of the external cover through the space.

An electronic apparatus according to another aspect of the present invention includes an external device that is electrically connected to a main unit by a plurality of electric cables. The external device includes a casing member storing a function unit; an external cover covering the casing member; and a space provided between the casing member and the external cover. The electric cables are pulled out of the casing member, bundled together, supported by the casing member, and extended out of the external cover through the space.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 15A and 15B are diagrams of a conventional image forming apparatus;

DETAILED DESCRIPTION OF THE PREFERRED EMBODIMENTS

Exemplary embodiments of the present invention will be described below with reference to accompanying drawings. The present invention is not limited to these embodiments.

Figure 1A:
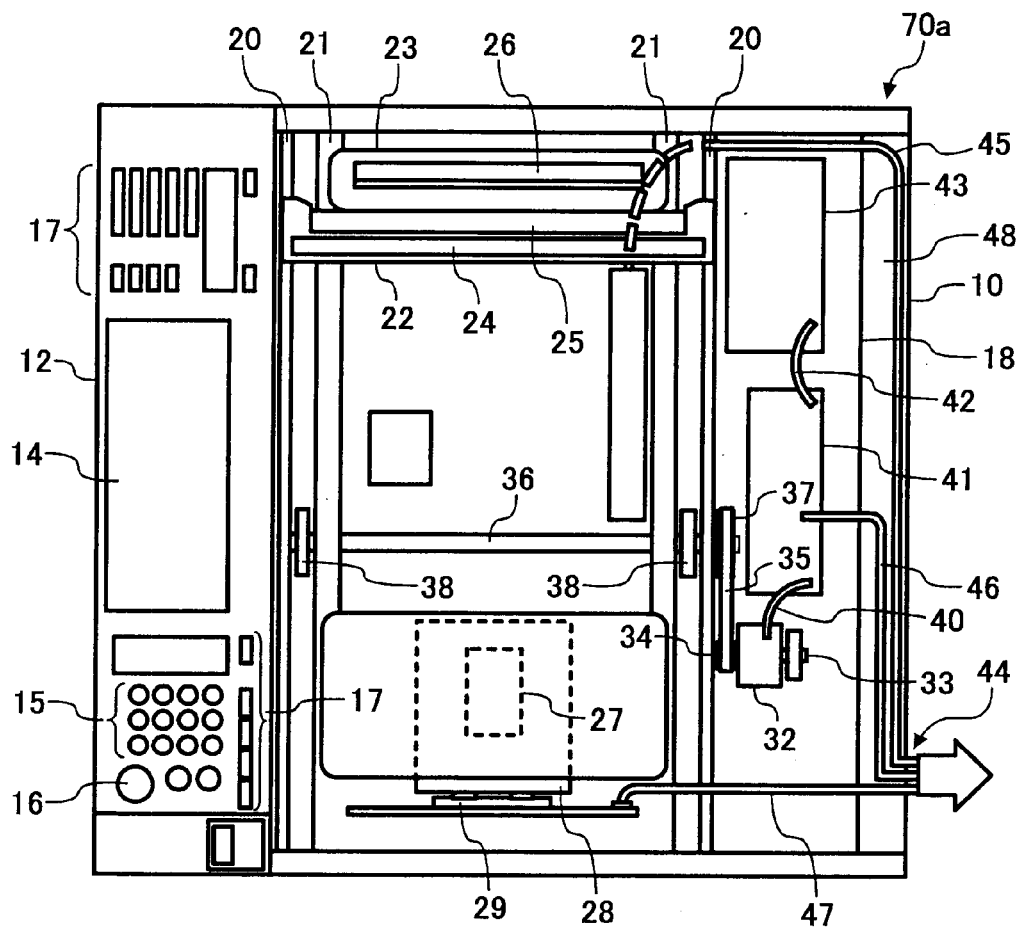
FIGS. 1A and 1B are diagrams of an image reading unit as an example of an external device according to the present invention.
Figure 1B:
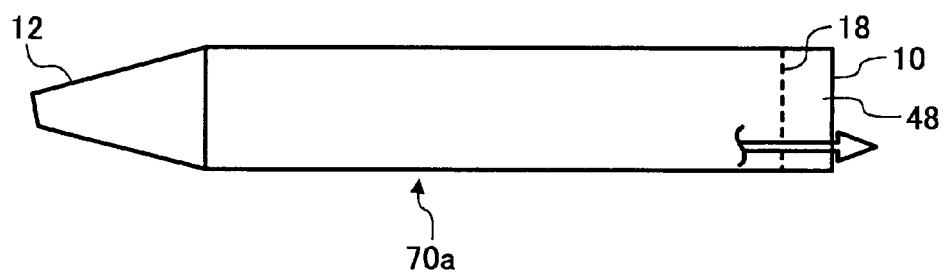

FIGS. 1A and 1B are diagrams of an image reading unit 70a. The image reading unit 70a is taken as an example of an external device that is attached to a main unit according to the present invention. FIG. 1A is a top view of the image reading unit 70a, and FIG. 1B is a side view of the image reading unit 70a.

An external cover 10 is box made of decorative resin laminate plates, with a contact glass on the top surface. An operation section 12 is provided on the front side of the image reading unit 70a. The operation section 12 includes a display unit 14 (such as a liquid crystal display panel), a 10-key numeric keypad 15, a start switch 16, and switches 17 that are operated manually. A casing member 18 is provided inside the external cover 10. The casing member 18 is, for example, a steel plate. A reading section for reading an image of an original is provided inside the casing member 18.

The reading section includes a first pair of rails (hereinafter, "first rails") 20 and a second pair of rails (hereinafter, "second rails") 21, positioned parallel to each other. The first rails 20 are located in front of the second rails 21 as viewed from the front of the image reading unit 70a. A first traveling body 22 is mounted on the first rails 20 and a second traveling body 23 is mounted on the second trails 21. In an initial state, both the first traveling body 22 and the second traveling body 23 are positioned on the left side as viewed from the front of the image reading unit 70a. A light source 24 and a first mirror 25 are mounted on the first traveling body 22. Second and third mirrors 26 are mounted on the second traveling body 23. A lens 27, a lens block 28, and a charge-coupled device (CCD) substrate 29 are provided on the right side inside the casing member 18, as viewed from the front of the image reading unit 70a.

Furthermore, the reading section includes a driving motor 32 that is penetrated with a driving shaft 33. A driving pulley 34 is attached to the driving shaft 33. A timing belt 35 is wound around the driving pulley 34 and a driven pulley 37 attached to a driven shaft 36. Wire driving pulleys 38 are attached to both ends of the driven shaft 36. Wires (not shown) for pulling the first traveling body 22 and the second traveling body 23 are wound around the wire driving pulleys 38.

The driving motor 32 is electrically connected to a control substrate 41 with a wire 40. The control substrate 41 is a serial input-output (SIO), and is electrically connected to a regulator 43 with a wire 42.

Figure 2:
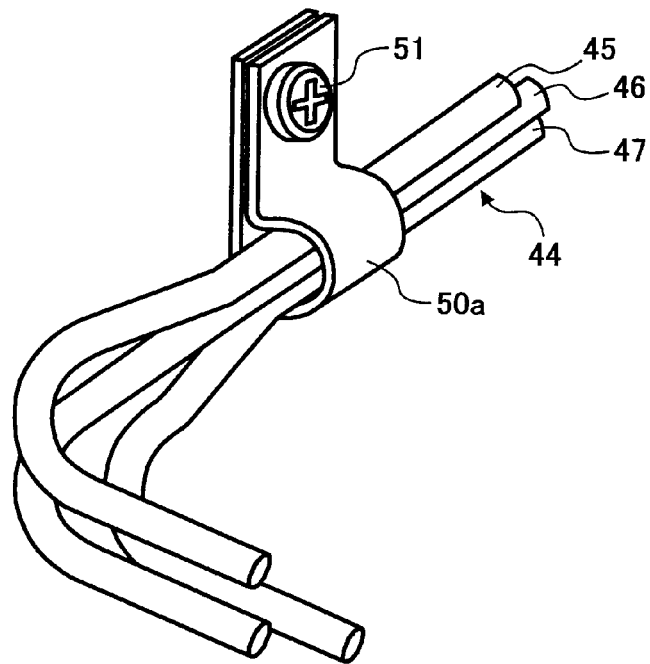
FIG. 2 is a perspective view of a holding member that holds electric cables of the image reading unit shown in FIG. 1.

An electric cable 45 connects the reading section to a power source. An electric cable 46 for transmitting control signals is electrically connected to the control substrate 41. An electric cable 47 for transmitting image signals is electrically connected to the CCD substrate 29. These electric cables 45, 46, 47 extend outside the casing member 18. The electric cables 45, 46 pass through a cable-passing space 48 provided between the casing member 18 and the external cover 10, and are bundled with the electric cable 47 in the cable-passing space 48. For example, as shown in FIG. 2, the electric cables 45, 46, 47 are bundled together (hereinafter, "electric cables 44") with a belt-type holding member 50a, and the holding member 50a is attached to the casing member 18 with a screw 51. Accordingly, the electric cables 44 are supported by the casing member 18 with the holding member 50a.

Figure 3:
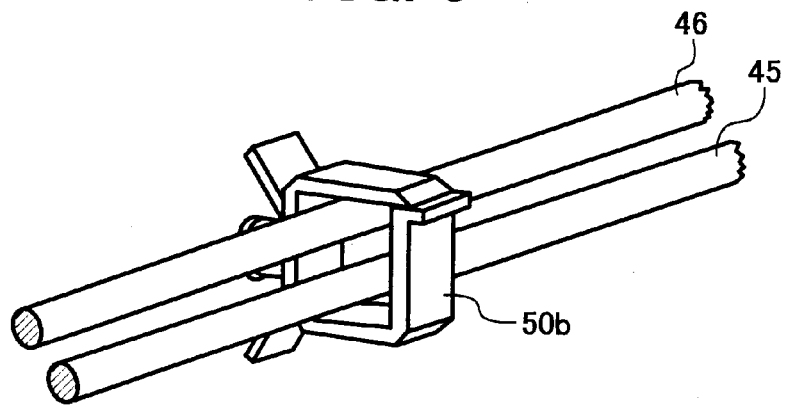
FIGS. 3 to 6 are perspective views of various holding members.

FIG. 3 is a perspective view of another example of a holding member 50b. The holding member 50b is a rectangular frame made of resin, and is used as a harness clamp to hold the electric cables 45, 46 in the cable-passing space 48. The holding member 50b is attached to the casing member 18. Accordingly, the electric cables 45, 46 are supported by the casing member 18 with the holding member 50b.

Figure 4:
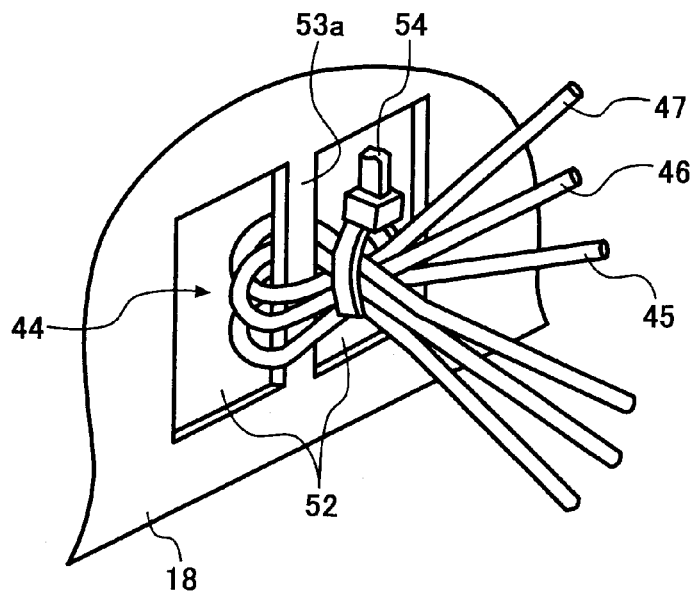

FIG. 4 is a perspective view of still another example of a holding member 53a. The holding member 53a is a thin, long plate that is formed by opening two rectangular holes 52 adjacent to each other in the casing member 18. The electric cables 44 are bundled together and wound around the holding member 53a, so as to be supported by the casing member 18. The electric cables 44 can be bound with a binder 54, so that they are not pulled out easily. Moreover, when load is applied to connectors or an electrical substrate for mounting electrical components, the electric cables 44 are safely prevented from being damaged.

Figure 5:
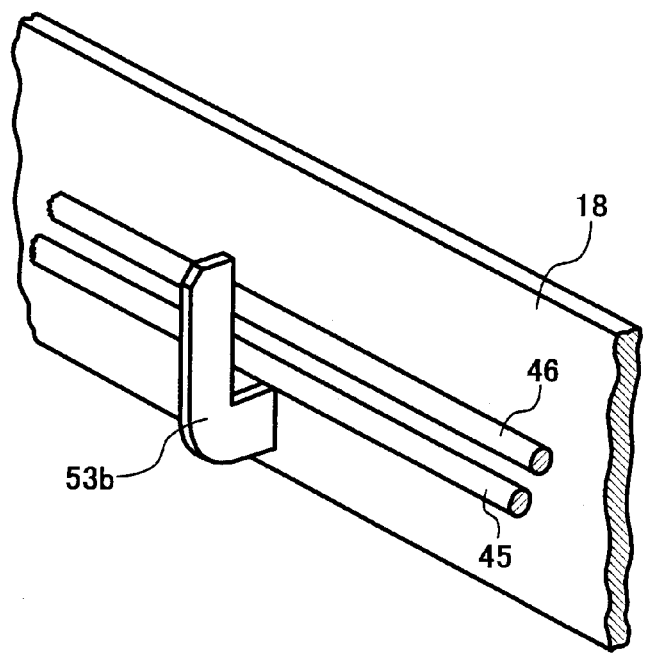
Figure 6:
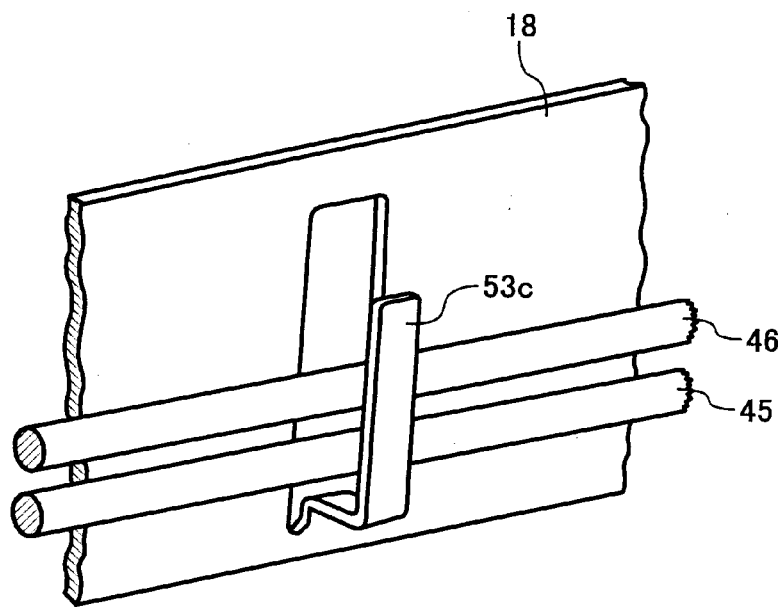

FIG. 5 is a perspective view of still another example of a holding member 53b. The holding member 53b is an L-shaped hook formed integrally on the casing member 18 by resin molding. The electric cables 45, 46 are hooked onto the holding member 53b. FIG. 6 is a perspective view of still another example of a holding member 53c. If the casing member 18 is a metal plate, the metal plate is cut and raised to form the holding member 53c. The electric cables 45, 46 are hooked onto the holding member 53c.

Figure 7:
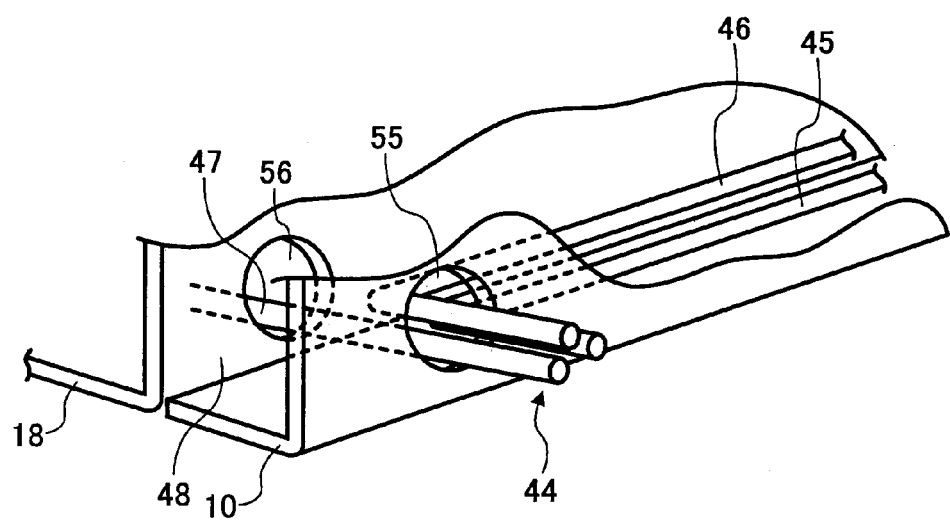
FIG. 7 is an enlarged perspective view of the electric cables extending outside the image reading unit.

As shown in FIG. 7, the bundled electric cables 44 extend outside the cable-passing space 48 through a hole 55 provided on the external cover 10. The electric cable 47 extends outside the casing member 18 through a hole 56 provided on the casing member 18. The electric cables 45, 46 also extend outside the casing member 18 through another hole (not shown) provided on the casing member 18.

Figure 8:
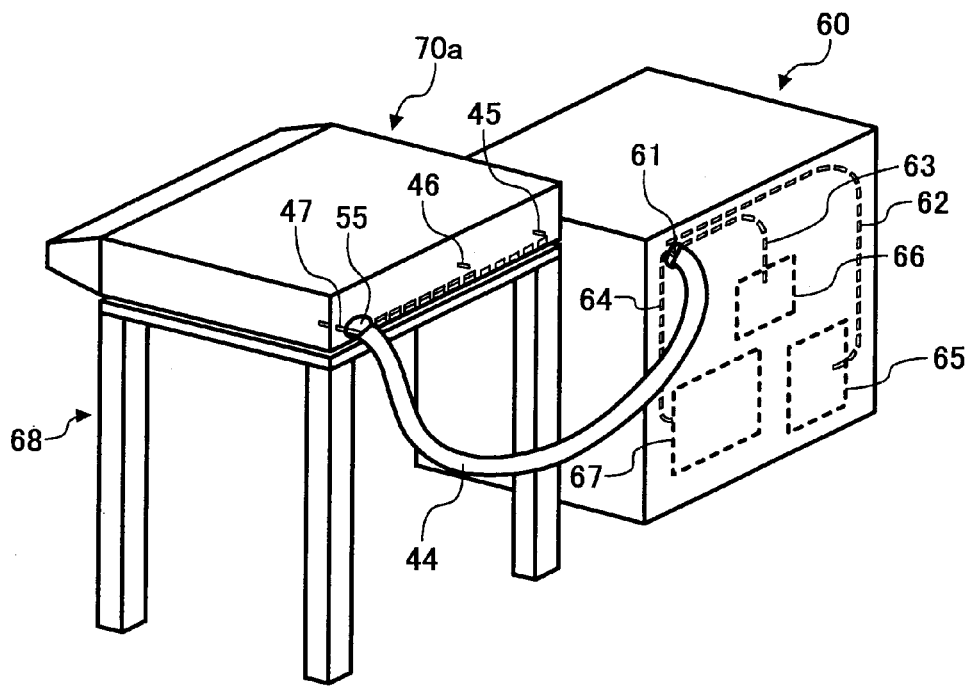
FIG. 8 is a perspective view of the image reading unit connected to an imaging device.

As shown in FIG. 8, the image reading unit 70a is connected by the electric cables 44 to an imaging device 60 that is a main unit. Specifically, the electric cables 44 extend outside the external cover 10 and connect to the imaging device 60 through a hole 61 on the imaging device 60. The electric cables 45, 46, 47 are connected to electric cables 62, 63, 64 of the imaging device 60. The electric cables 62, 63, 64 are electrically connected to electrical substrates 65, 66, 67, respectively. The image reading unit 70a is placed on a table 68.

Accordingly, when the image reading unit 70a is connected to the imaging device 60 with the electric cables 44, regardless of the positions of the image reading unit 70a and the imaging device 60, the electric cables 44 are safely prevented from being pulled out or damaged. Moreover, the electric cables 44 do not spoil the appearance of the devices because they are bundled together.

A wire for using inside a device and a wire for using outside a device are connected in the cable-passing space 48 to form each of the electric cables 45, 46, 47. Accordingly, and the wires for using outside a device extend outside the external cover 10 through the hole 55, and the wires for using inside a device stay inside the casing member 18.

Thus, the wires that have resistance to physical pressure and noise are used for the portion of the electric cables 45, 46, 47 outside the image reading unit 70a. These wires are expensive, thick and thus require effort to assemble, and lack flexibility, but are suitable for external usage. On the other hand, cables inside a device are unlikely to be affected by physical pressure or noise caused by interference. Thus, wires that are flexible, easy to assemble, and inexpensive are used for the portion of the electric cables 45, 46, and 47 inside the image reading unit 70*a*. Accordingly, different types of wires can be used as the electric cables depending on the location.

Figure 9:
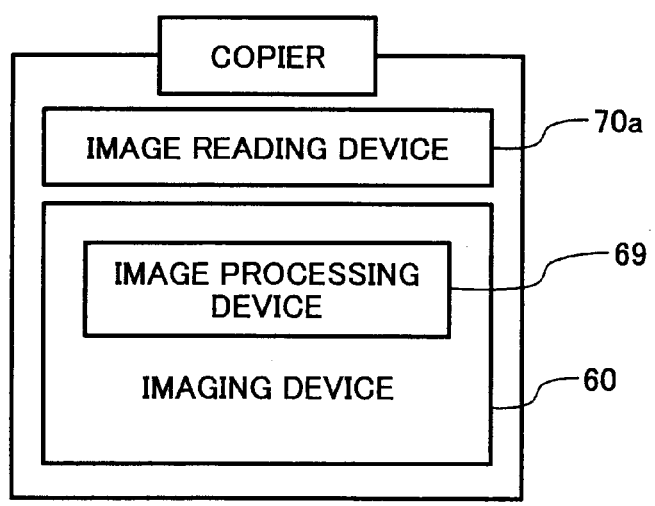
FIG. 9 is a block diagram of the image reading unit and the imaging device shown in FIG. 8.

FIG. 9 is a block diagram of a copier (image forming apparatus) in which the image reading unit 70*a* is connected to the imaging device 60. The image reading unit 70*a* and the imaging device 60 send electric signals to each others through the electric cables 62, 63, 64 and the electric cables 45, 46, 47, so that an image processing device 69 provided in the imaging device 60 controls the image reading unit 70*a*. Accordingly, the image reading unit 70*a* reads an image, the image processing device 69 edits and processes the image read by the image reading unit 70*a*, and then the imaging device 60 forms the final image.

To take a copy of an original, a user sets the original on the contact glass, and holds it down with an original presser (not shown). The user manually operates the operation section 12 to set a desired copy mode, and presses the start switch 16. The control substrate 41 drives the driving motor 32, and rotates the driving shaft 33 to run the timing belt 35 with the driving pulley 34. Thus, the driven shaft 36 is rotated by the driven pulley 37 so that the wire driving pulleys 38 are rotated. The wire driving pulleys 38 pulls the wires (not shown) to move in parallel the first traveling body 22 along the first rails 20 and the second traveling body 23 along the second rails 21. The first traveling body 22 and the second traveling body 23 move at a ratio of 2:1.

The light source 24 irradiates a light to the original through the contact glass, and scans the original when the first traveling body 22 and the second traveling body 23 are moving. The light is reflected from the original through the contact glass to the first mirror 25, reflected from the first mirror 25 to the second and third mirrors 26, and then focused through the lens 27. Subsequently, the CCD substrate 29 converts light signals of the focused light into electric signals to read the image of the original. The electric signals read by the image reading unit 70*a* are sent to the imaging device 60 through the electric cable 47. Based on the electric signals received, the imaging device 60 records an image onto recording media such as paper or an overhead projector (OHP) film.

The copier includes the imaging device 60 as the main unit and the image reading unit 70*a* as the external device. However, an image forming apparatus according to the present invention is not limited to these examples. Any other host device can be used as the main unit and any other device that enhances functions of the host device can be used as the external device, provided that they are electrically connected by electric cables.

Figure 10A:
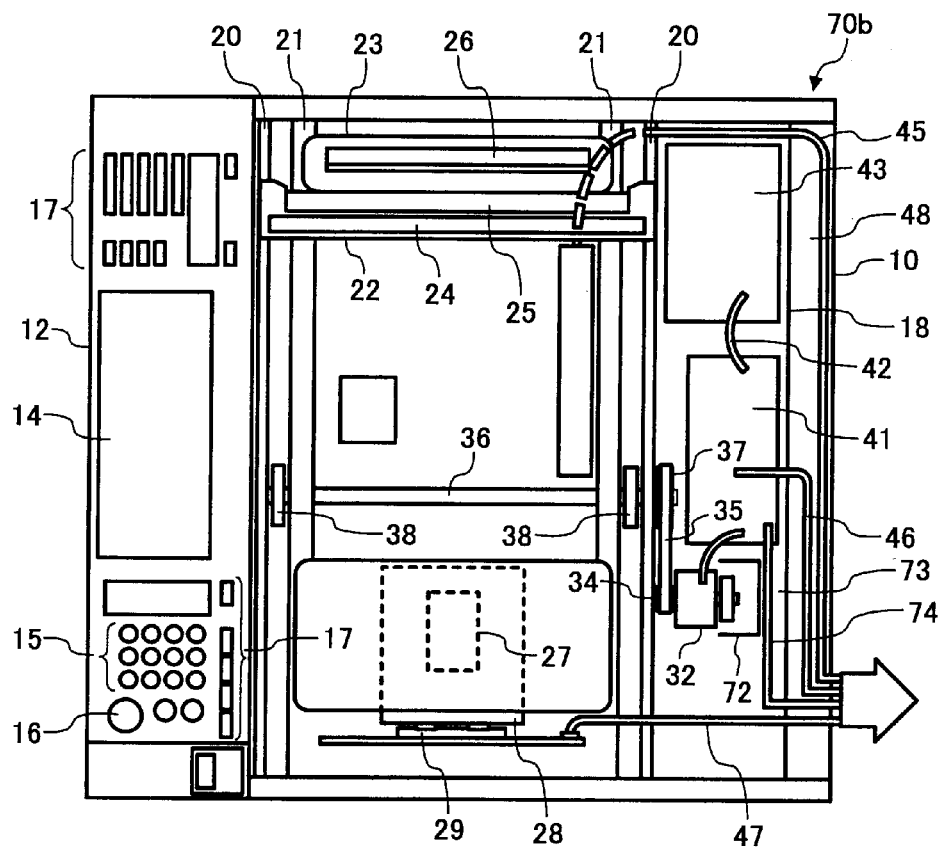
FIGS. 10A to 11B are diagrams of various image reading units.
Figure 10B:
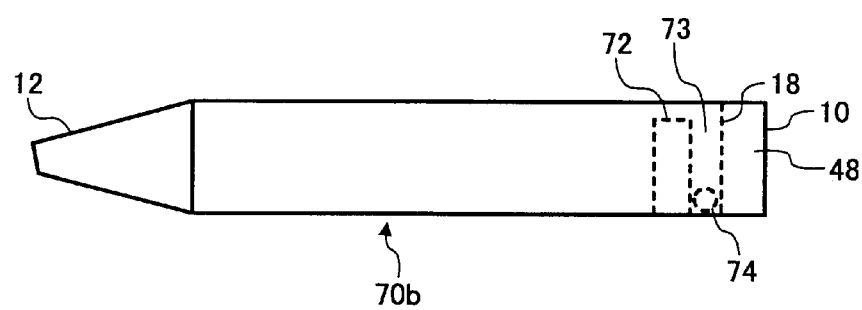

FIGS. 10A and 10B are diagrams of another example of an image reading unit 70*b*. The image reading unit 70*b* is similar to the image reading unit 70*a* shown in FIGS. 1A and 1B. Thus, common components are denoted by the same reference numerals and overlapping descriptions are omitted.

The image reading unit 70*b* includes a second casing member 72 that encloses the driving motor 32. The second casing member 72 can be a steel plate like the casing member 18. The second casing member 72 is bent at two positions, and is placed upright and screwed on the base surface of the image reading unit 70*b*. As a result, a second cable-passing space 73 is formed between the second casing member 72 and the casing member 18.

An electric cable 74 is connected to the control substrate 41, and passes through the second cable-passing space 73. The electric cable 74 can be used for connecting to a power source; in this case, the electric cable 74 is used for transmitting CCD signals. The second cable-passing space 73 can be any width, as long as the electric cable 74 can be laid through the space.

The electric cable 74 extends outside the casing member 18 together with the electric cable 47; the electric cables 47, 74 merge with the electric cables 45, 46 in the cable-passing space 48; the electric cables 45, 46, 47, 74 are bundled together, and extend outside the external cover 10.

Accordingly, when it is difficult to pass the electric cable 74 through the cable-passing space 48 because of the position of the control substrate 41 or the direction of the electric cable 74 coming out of the control substrate 41, the electric cable 74 can be passed through the second cable-passing space 73. Accordingly, the second casing member 72 protects the electric cable 74 from noise or heat emitted from the driving motor 32, etc.

Figure 11A:
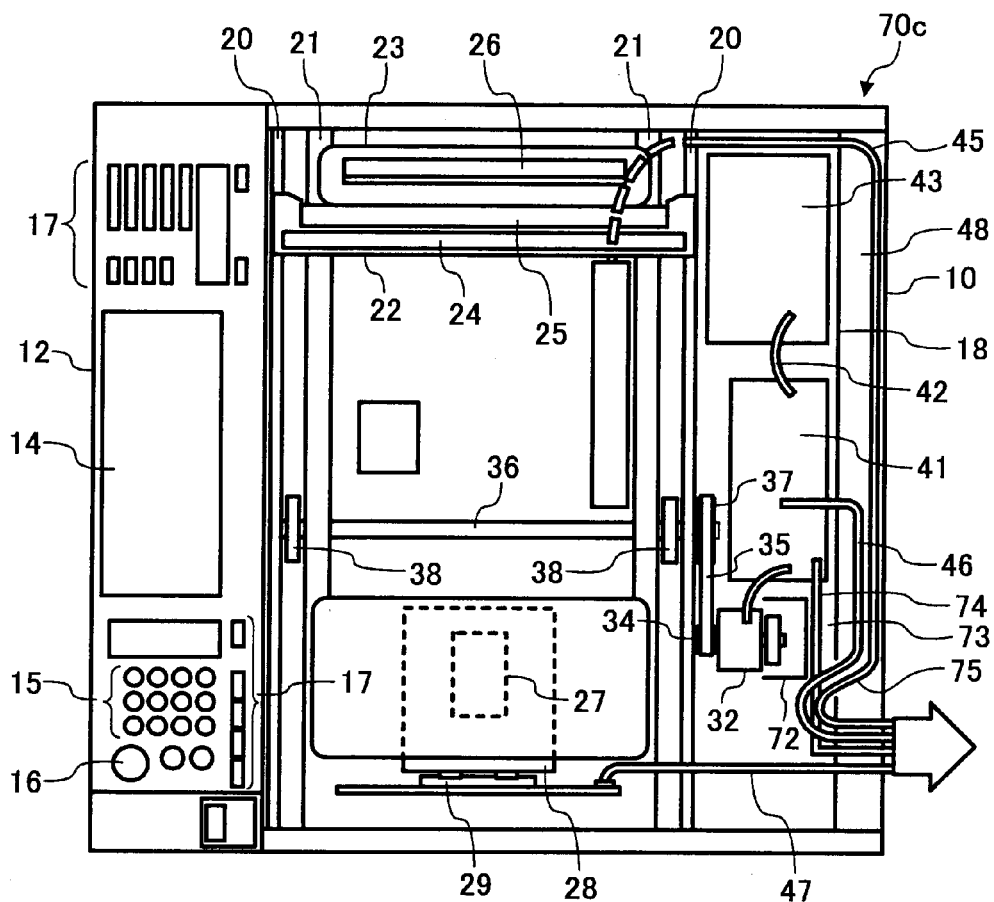
Figure 11B:
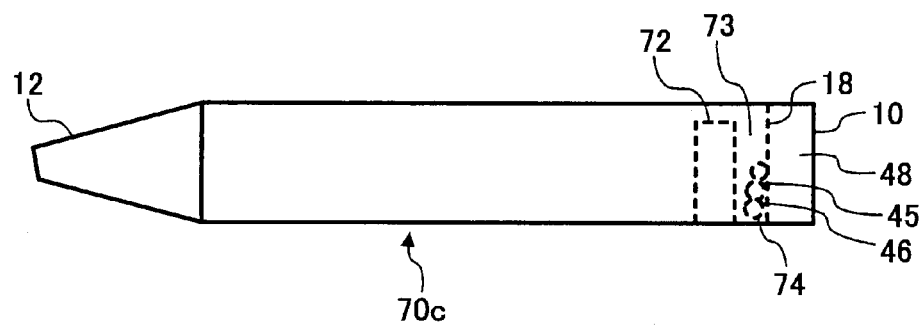

FIGS. 11A and 11B are diagrams of another example of an image reading unit 70*c*. The image reading unit 70*c* is similar to the image reading unit 70*b* shown in FIGS. 10A and 10B. Thus, common components are denoted by the same reference numerals and overlapping descriptions are omitted.

The casing member 18 in the image reading unit 70*c* has a notch 75. The electric cables 45, 46 passing through the cable-passing space 48 are inserted through the notch 75 into the second cable-passing space 73; the electric cables 45, 46 merge with the electric cable 74 in the second cable-passing space 73; the electric cables 45, 46, 74 merge with the electric cable 47 further on in the second cable-passing space 73; the electric cables 45, 46, 47, 74 are bundled together, and extend outside the external cover 10.

Accordingly, the electric cables 45, 46 passing through the cable-passing space 48 are largely curved, so that they do not have to be acutely bent near the outlet. This prevents the cables from being disconnected. Moreover, even when it is difficult to bend the electric cables 45, 46 because they have large diameters or they are covered with a thick material, they can be easily extended outside by being largely curved. Furthermore, the notch 75 and the second casing member 72 receive forces of the electric cables 45, 46 to become straight, and retain a curved state. Thus, the electric cables 45, 46 are prevented from coming into contact with the driving motor 32 and receiving heat from the driving motor 32.

Figure 12A:
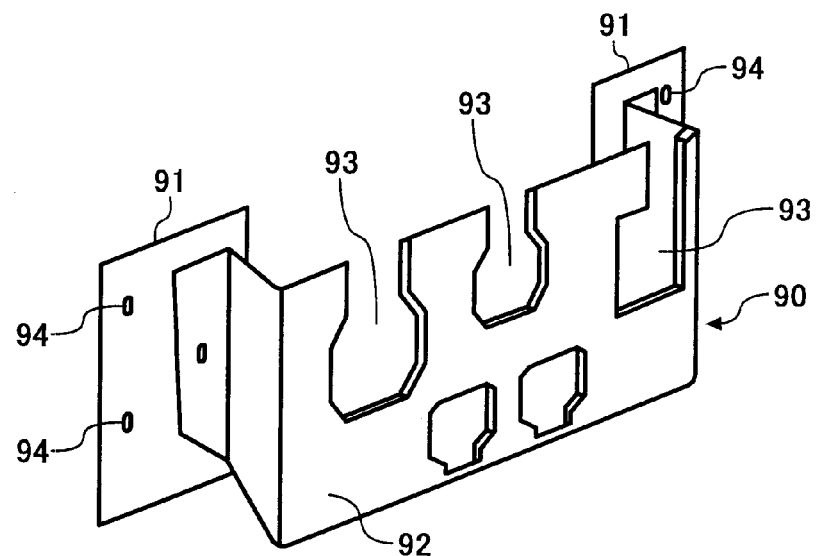
FIG. 12A is a perspective view of a holding cover that holds the electric cables.
Figure 12B:
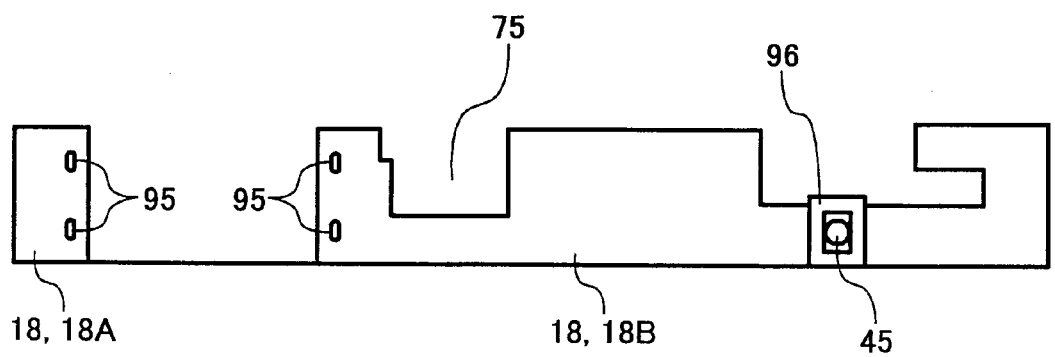
FIG. 12B is a back view of a casing member that supports the holding cover.

FIG. 12A is a perspective view of a holding cover 90 that holds the electric cables, and FIG. 12B is a back view of the casing member 18 that supports the holding cover 90.

The holding cover 90 can be a steel plate like the casing member 18. The holding cover 90 is bent at two positions so as to form a flat holding surface 92 in the middle. The holding surface 92 has a plurality of holding parts 93 that are notches and holes, for passing through the electric cables. Rectangular plates 91 are screwed or welded to both sides of the holding cover 90, and each have a plurality of screw holes 94.

The casing member 18 is placed upright and screwed on the base surface of the image reading unit 70*c*. The casing member 18 can be a single plate; however, the casing member 18 in this example is separated into two parts 18A and 18B with a space in between them for attaching the holding cover 90. The edges of the parts 18A and 18B that face each other have screw holes 95. The part 18B has the notch 75, and an outlet for the electric cable 45. A cubical protection member 96 made of resin or rubber is detachably attached to the outlet. The electric cable 45 is passed through the protection member 96 to be supported by the casing member 18. This prevents the electric cable 45 from being scraped against the rim of the outlet so as to protect a cover of the electric cable 45 from being damaged.

The screw holes 94 are fit against the screw holes 95, and the holding cover 90 is screwed to the casing member 18. As a result, the holding surface 92 is held in parallel with the casing member 18 and near the back surface of the external cover 10. Accordingly, the holding cover 90 protrudes into the cable-passing space 48, obstructing the electric cables 45, 46.

The electric cables 45, 46 passing through the cable-passing space 48 are inserted through the notch 75 into the second cable-passing space 73; the electric cables 45, 46 are bundled with the electric cable 74 in the second cable-passing space 73; the electric cables 45, 46, 74 are bundled with the electric cable 47 further on in the second cable-passing space 73; the electric cables 45, 46, 47, 74 are passed through the holding parts 93 of the holding cover 90, and extend outside the casing member 18 and the external cover 10. Accordingly, the bundled electric cables 45, 46, 47, 74 are prevented from falling apart.

Protection members made of resin or rubber similar to the protection member 96 can be detachably attached to the holding parts 93. Accordingly, the electric cables 45, 46, 47, 74 are prevented from being scraped against rims of the holding parts 93 so as to protect covers of the electric cables 45, 46, 47, 74 from being damaged. The holding member 96 is provided separately from the electric cable; however, the holding members can be provided integrally with the electric cables and be detachably attached to the holding parts 93.

Figure 13A:
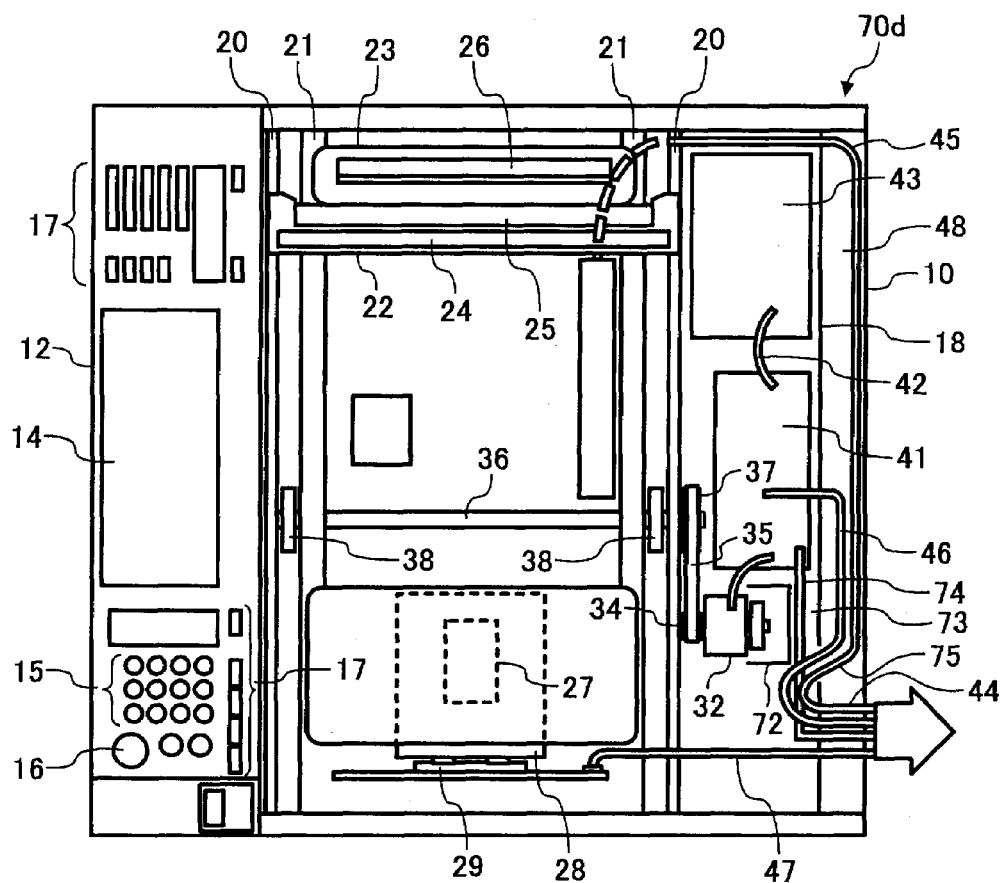
FIGS. 13A and 13B are diagrams of still another image reading unit.
Figure 13B:
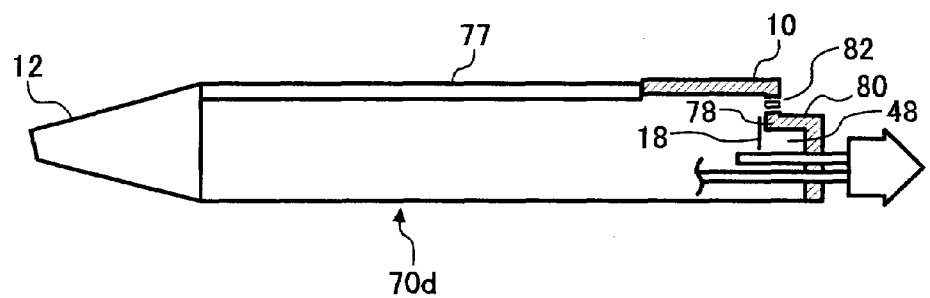
Figure 14A:
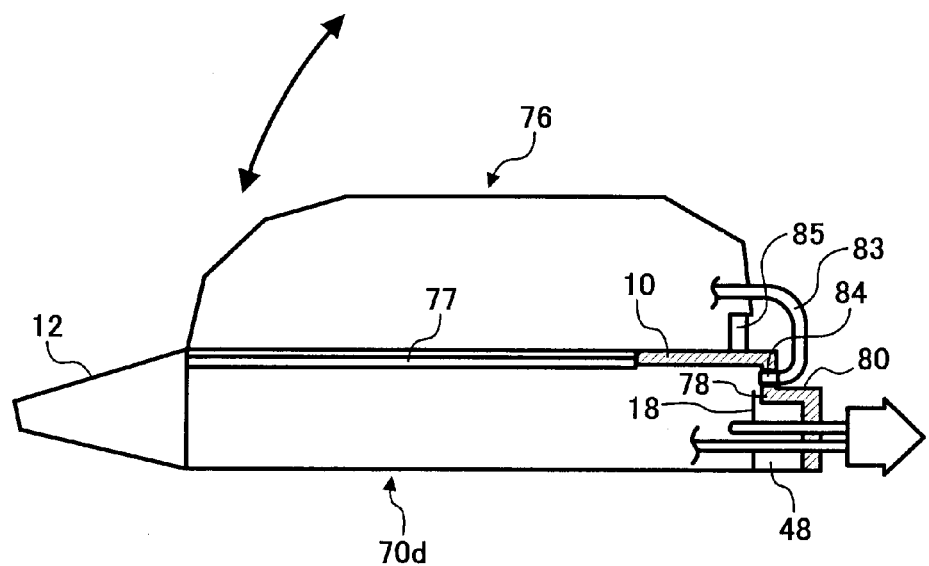
FIG. 14A is a side view of an automatic document feeder mounted on the image reading unit shown in FIGS. 13A and 13B.
Figure 14B:
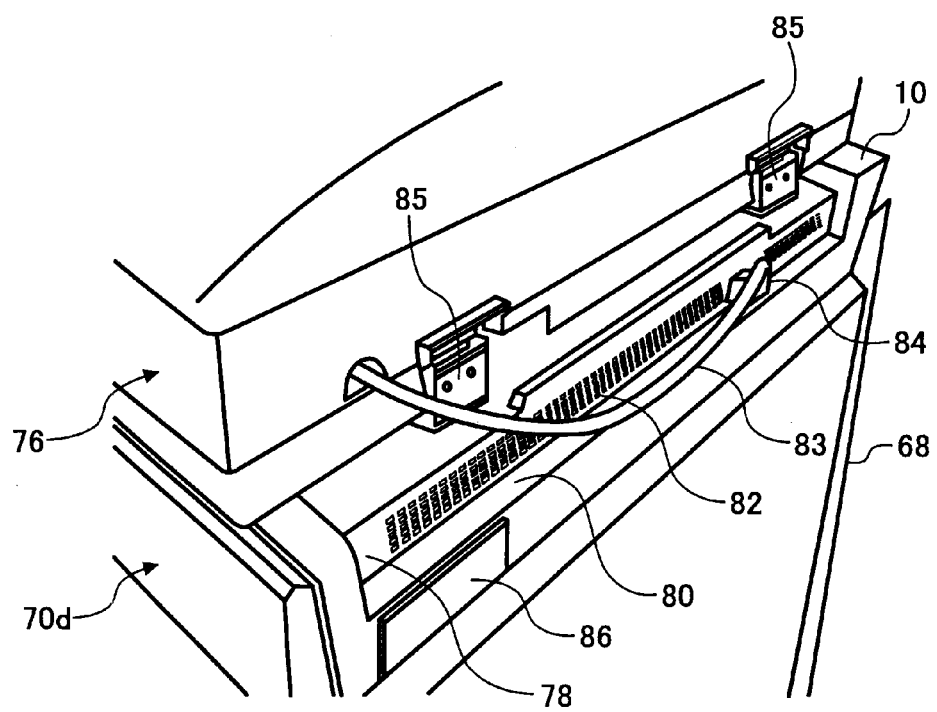
FIG. 14B is a back perspective view of the automatic document feeder on the image reading unit.
Figure 16:
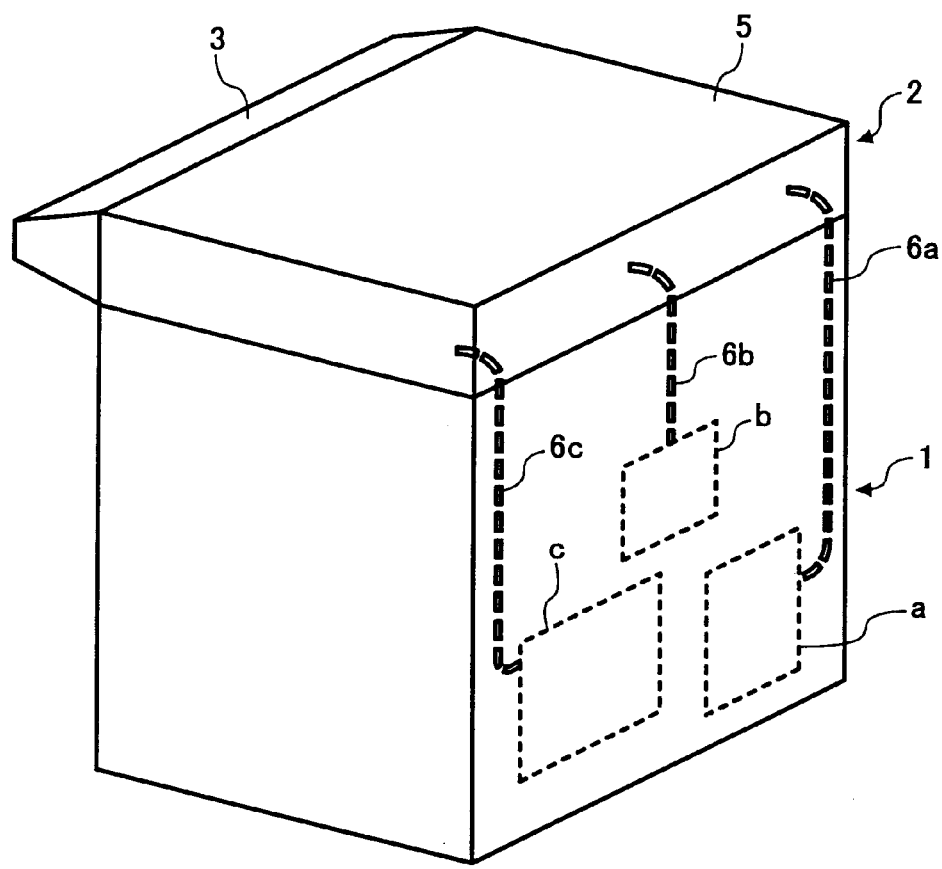
FIG. 16 is a perspective view of the conventional image forming apparatus where an imaging device and an image reading unit are provided integrally.
Figure 17:
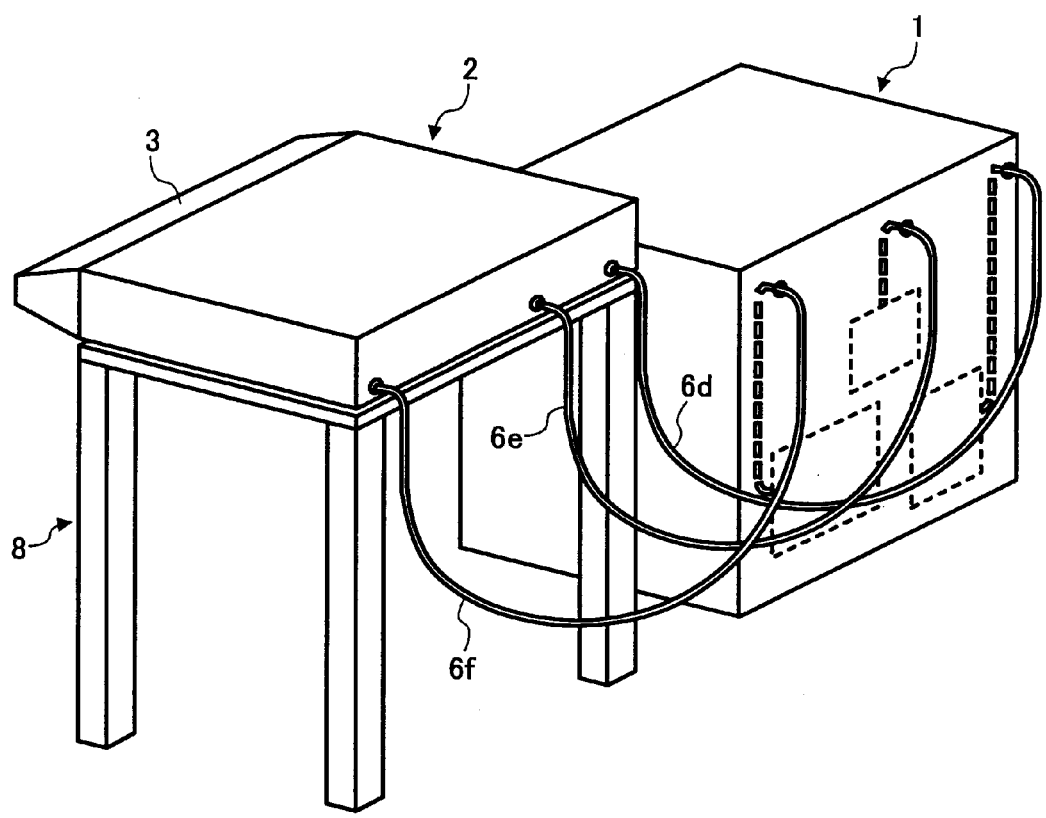
FIG. 17 is a diagram of the conventional image forming apparatus where the imaging device and the image reading unit are provided separately.
Figure 18:
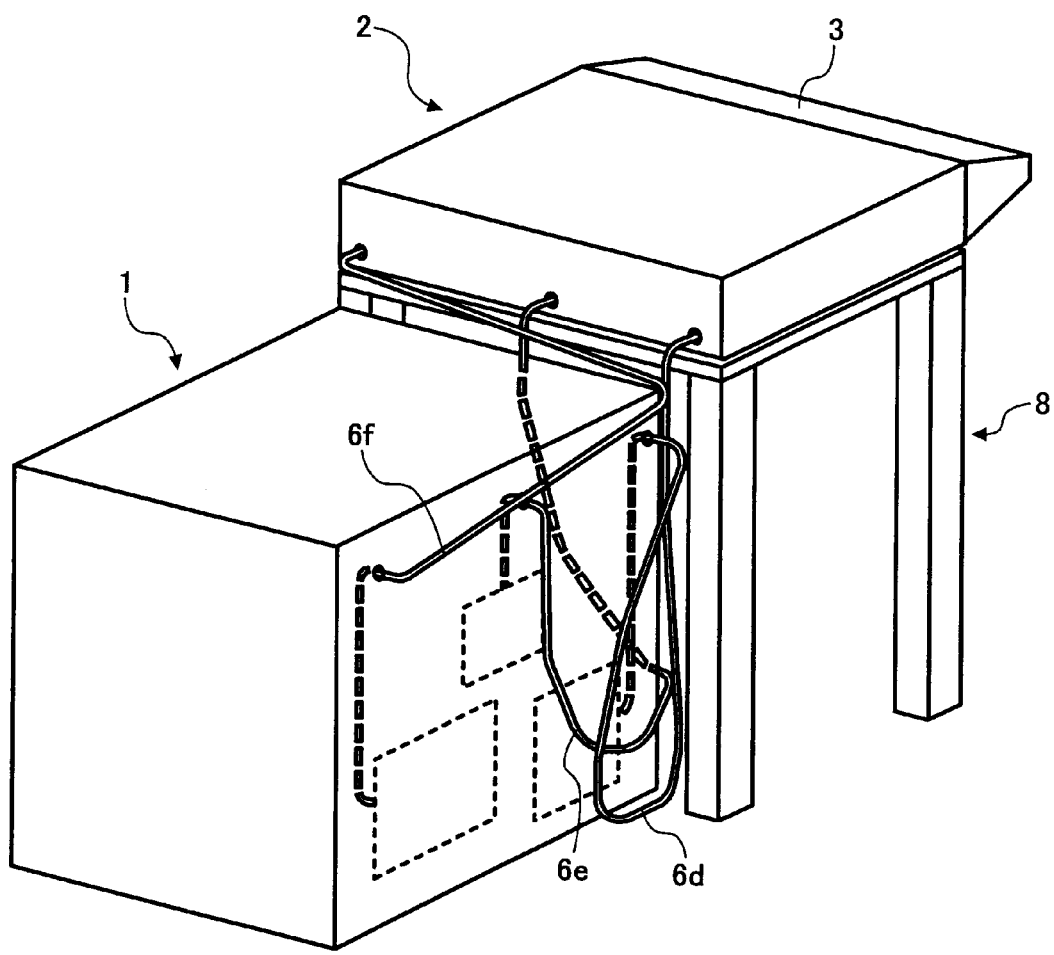
FIG. 18 is a diagram of the conventional image forming apparatus where the imaging device and the image reading unit are provided separately and located in positions different to that shown in FIG. 17.

FIGS. 13A and 13B are diagrams of another example of an image reading unit 70d. The image reading unit 70d is similar to the image reading unit 70c shown in FIGS. 11A and 11B. Thus, common components are denoted by the same reference numerals and overlapping descriptions are omitted. FIG. 14A is a side view of an automatic document feeder 76 mounted on the image reading unit 70d, and FIG. 14B is a back perspective view of the automatic document feeder 76 on the image reading unit 70d.

The external cover 10 of the image reading unit 70d has a large contact glass 77 on the top surface, and a vertical wall 78 on the back surface. The vertical wall 78 has a step part 80 that is lower than the top surface of the external cover 10. The height of the step part 80 determines the height of the cable-passing space 48. The vertical wall 78 also has an exhaust outlet 82 for exhausting air from the external cover 10. An electric cable 83 connects the image reading unit 70d and the automatic document feeder 76. The vertical wall 78 has a connection part 84 to which the electric cable 83 is connected. The electric cable 83 rests on the step part 80.

The automatic document feeder 76 is attached to the image reading unit 70d by hinges 85 on the back surface, and opens/closes in a direction indicated by an arrow in FIG. 14A.

The step part 80 lowers the height of the cable-passing space 48; thus, the electric cables 45, 46 are prevented from shifting and floating in the cable-passing space 48. The vertical wall 78 has the exhaust outlet 82; thus, heat emitted by the driving motor 32 and other electronic parts can be discharged outside the external cover 10.

The electric cable 83 rests on the step part 80 of the vertical wall 78. Thus, the electric cable 83 is prevented from hanging out of the image reading unit 70d; when the automatic document feeder 76 is opened/closed, the electric cable 83 is prevented from tangling with the other electric cables 44, or being caught on a corner of the table 68, or being pressed against a wall near the image reading unit 70d and hampering the automatic document feeder 76 from opening/closing; and the electric cable 83 is prevented from being caught in between the image reading unit 70d and a wall.

When the image reading unit 70d is provided integrally with the imaging device 60, electric cables are connected internally. In this case, the hole through which the electric cables 44 extend outside is shielded with a cover member 86, thus preventing dust from entering inside.

According to the present invention, in an external device that is electrically connected to a main unit with electric cables, regardless of positions of the main unit and the external device, the electric cables are safely protected, and the electric cables do not spoil the appearance of the devices.

Furthermore, according to the present invention, the electric cables are not pulled out easily when being pulled out, the electric cables are not immediately damaged when load is applied to connectors or an electrical substrate for mounting electrical components, and it is possible to provide the electric cables even more safely.

Moreover, according to the present invention, different types of wires can be used as the electric cables depending on the location. Specifically, for the portion of the electric cables outside the external device, wires that have resistance to physical pressure and noise are used. These wires are expensive, thick and thus require effort to assemble, and lack flexibility, but are suitable for external usage. On the other hand, for the portion of the electric cables inside the external device, where the cables are unlikely to be affected by physical pressure or noise caused by interference, wires that are flexible, easy to assemble, and inexpensive, are used.

Furthermore, according to the present invention, when it is difficult to pass the electric cable through a cable-passing space because of the position of a control substrate or the direction of the electric cable coming out of the control substrate, the electric cable can be passed through a second cable-passing space, so that a second casing member protects the electric cable from noise or heat emitted from a driving motor, etc.

Moreover, according to the present invention, the electric cables passing through the cable-passing space are largely curved, so that they are prevented from being disconnected. When it is difficult to bend the electric cables because they have large diameters or they are covered with a thick material, they can be easily extended outside, while being prevented from coming into contact with the driving motor.

Furthermore, according to the present invention, the electric cables are bundled together so as not to fall apart. Thus, the electric cables are safely protected, and the electric cables do not spoil the appearance of the devices.

Moreover, according to the present invention, the electric cable is passed through a protection member and supported by a casing member. Thus, the electric cable is prevented from being scraped against an outlet of the casing member, so that a cover of the electric cable is prevented from being damaged.

Furthermore, according to the present invention, the electric cables are prevented from shifting and floating in the cable-passing space.

Moreover, according to the present invention, heat emitted by the driving motor and other electronic parts can be discharged outside through an exhaust outlet.

Furthermore, according to the present invention, the electric cable connecting an image reading unit and an automatic document feeder is placed on a step part of a vertical wall provided on the back surface of an external cover of the image reading unit. Thus, the electric cable is prevented from hanging out of the image reading unit; when the automatic document feeder is opened/closed, the electric cable is prevented from tangling with the other electric cables, or being caught on a corner of a table, or being pressed against a wall near the image reading unit and hampering the automatic document feeder from opening/closing; and the electric cable is prevented from being caught in between the image reading unit and a wall.

Moreover, according to the present invention, in an external device that is electrically connected to an imaging device with electric cables, regardless of positions of the imaging device and the external device, the electric cables are safely protected, and the electric cables do not spoil the appearance of the devices.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An external device that is electrically connected to a main unit by a plurality of electric cables, the external device comprising:
    a first casing member storing a function unit and provided with
        an outlet that guides a cable of the plurality of electric cables to a first space,
        a first guiding hole that guides the cable from an inside of the first space, and
        a holding cover including a second guiding hole that guides the cable, which is guided from the first space through the first guiding hole, back to the first space;
    an external cover covering and opposing to the first casing member and defining the first space between the first casing member and the external cover, the external cover being provided with a cable drawing hole opposing the second guiding hole, so that the cable is substantially linearly drawn outside from the cable drawing hole; and
    a holding member in the first space, the holding member being configured to hold the electric cables, wherein the electric cables are pulled out of the first casing member, bundled together, supported by the first casing member, and extended out of the external cover through the first space.

2. The external device according to claim 1, wherein the first guiding hole and the second guiding hole are separated by the holding member.

3. The external device according to claim 1, wherein the holding member is formed in the first casing member itself.

4. The external device according to claim 3, further comprising:
    a binder configured to bind the electric cables held by the holding member in a bundled state.

5. The external device according to claim 1, wherein the electric cables are formed by connecting internal electric wires with external electric wires in the first space, and the external electric wires are extended out of the external cover.

6. The external device according to claim 5, wherein the external electric wires are more flexible than the internal electric wires.

7. The external device according to claim 1, wherein a top surface of the external cover includes a vertical wall, a top of the vertical wall includes a step, and a height of the step determines a height of the first space.

8. The external device according to claim 7, wherein the vertical wall includes an exhaust outlet for exhausting air from inside the external cover.

9. The external device according to claim 7, wherein the external device is an image reading unit, the main unit is an imaging apparatus, an automatic document feeder is mounted on and connected to the image reading unit by an electric cable, and the vertical wall includes a connection part for connecting the electric cable.

10. An external device that is electrically connected to a main unit by a plurality of electric cables, the external device comprising:
    a first casing member storing a function unit and provided with
        an outlet that guides a cable of the plurality of electric cables to a first space,
        a first guiding hole into which the cable is guided from the first space, and
        a holding cover including a second guiding hole that guides the cable, which is guided into the first guiding hole, back to the first space;
    an external cover covering and opposing to the first casing member and defining the first space between the first casing member and the external cover, the external cover being provided with a cable drawing hole opposing the second guiding hole, so that the cable is substantially linearly drawn outside from the cable drawing hole; and
    a second casing member that encloses the function unit inside the first casing member and defining a second space between the first casing member and the second casing member, the first guiding hole guiding the cable to an inside of the second space, wherein
    a first group of the electric cables are pulled out of the first casing member, bundled together, supported by the first casing member, and extended out of the external cover through the first space, the first group of the electric cables extending into the second space and out of the first casing member again, and
    a second group of the electric cables, which passes through the second space, are pulled out of the first casing member, bundled together with other electric cables passed through the first space, and extended out of the external cover.

11. The external device according to claim 10, wherein the holding cover is made of a steel plate and includes a holding part, the first casing member supports the holding cover such that the holding cover is inserted into the first space in such a manner that the holding cover blocks the first group of the electric cables, and the holding part holds the electric cables pulled out of the first casing member passing through the holding part.

12. The external device according to claim 11, wherein the holding part holds the electric cables pulled out of the first casing member passing through the holding part via an attachment holding member.

13. An electronic apparatus, comprising:
    an external device that is electrically connected to a main unit by a plurality of electric cables, wherein
    the external device includes
        a casing member storing a function unit and provided with
            an outlet that guides a cable of the plurality of electric cables to a space,
            a first guiding hole that guides the cable from an inside of the space, and
            a holding cover including a second guiding hole that guides the cable, which is guided from the space through the first guiding hole, back to the space;
        an external cover covering and opposing to the casing member and defining the space between the casing member and the external cover, the external cover being provided with a cable drawing hole opposing the second guiding hole, so that the cable is substantially linearly drawn outside from the cable drawing hole, and a holding member in the space, the holding member being configured to hold the electric cables, wherein the electric cables are pulled out of the casing member, bundled together, supported by the casing member, and extended out of the external cover through the space.

14. The electronic apparatus according to claim 13, wherein the external device is an image reading unit including a reading unit that reads an image of a document, the main unit is an imaging apparatus that receives an image signal of the image read from the image reading unit, and forms an image based on the image signal.

* * * * *